United States Patent [19]
Jourdain et al.

[11] Patent Number: 5,807,946
[45] Date of Patent: Sep. 15, 1998

[54] VEHICLE PARTS COMPRISING ETHYLENE/ 2-OLEFIN/VINYLNORBORNENE ELASTOMERIC POLYMERS

[75] Inventors: Eric Paul Jourdain, Houston; Periagaram S. Ravishankar, Kingwood, both of Tex.

[73] Assignee: Exxon Chemical Patents Inc., Wilmington, Del.

[21] Appl. No.: 490,265

[22] Filed: Jun. 14, 1995

[51] Int. Cl.$^6$ .................................................. C08F 210/18
[52] U.S. Cl. .................. 526/282; 526/336; 526/339; 526/348; 526/916; 526/938
[58] Field of Search ..................... 526/282, 916, 526/938, 339; 525/240, 211

[56] References Cited

U.S. PATENT DOCUMENTS 4,882,406  11/1989  Cozewith ................................ 526/336

FOREIGN PATENT DOCUMENTS 0094051   11/1983  European Pat. Off. .
61-151758  1/1988  Japan .
62-210169  3/1989  Japan .

*Primary Examiner*—Fred Zitomer
*Attorney, Agent, or Firm*—Douglas W. Miller

[57] ABSTRACT

Motor vehicle brake parts based on an ethylene, alpha-olefin, vinyl norbornene elastomeric polymer are manufactured with more efficiency due to brake part compounds having lower viscosity, faster and fuller cures than ethylene, alpha-olefins, diene monomer compounds, where the diene monomer is other than vinyl norbornene. Additionally, the brake parts based on the ethylene, alpha-olefin, vinyl norbornene elastomeric polymer have improved resistance to elevated temperature properties, and good heat aging characteristics, compared to for instance ethylene, alpha-olefin, non-conjugated diene elastomers (where the diene is other than vinyl norbornene) or styrene butadiene rubbers.

11 Claims, 1 Drawing Sheet

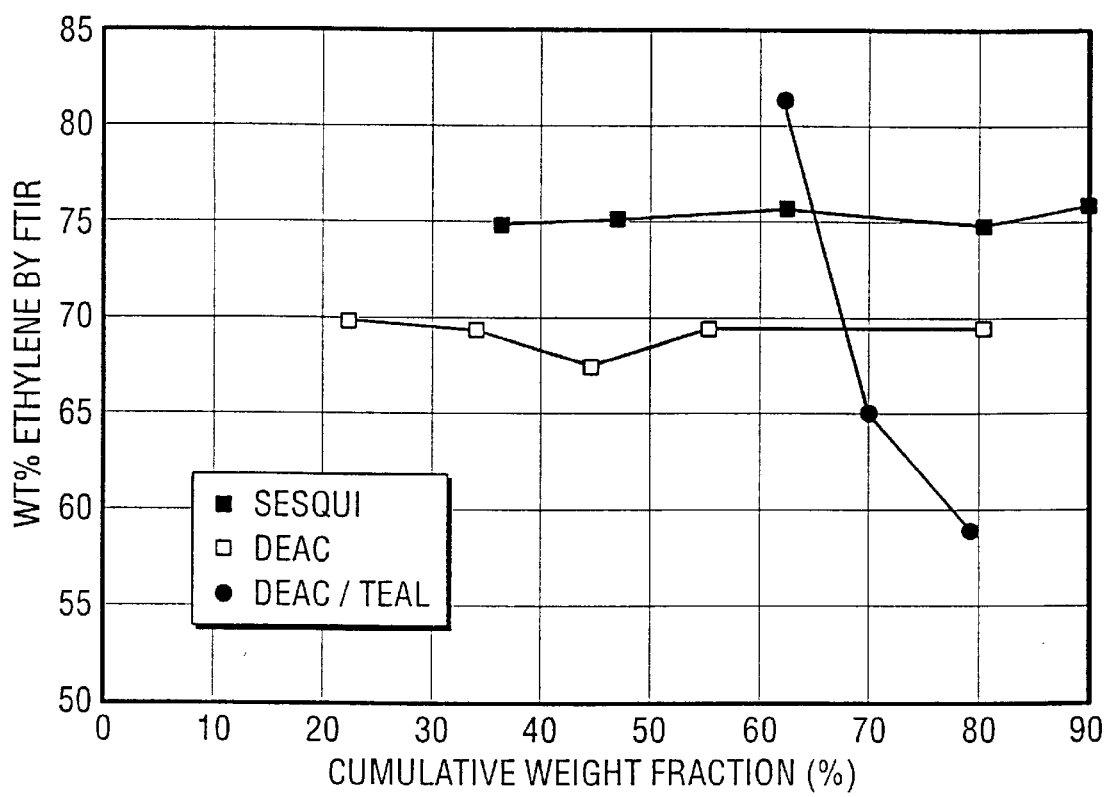

VEHICLE PARTS COMPRISING ETHYLENE/ 2-OLEFIN/VINYLNORBORNENE ELASTOMERIC POLYMERS

TECHNICAL FIELD

Embodiments of the present invention generally pertain to the field of molded or extruded elastomeric vehicle brake parts. More particularly, the present invention is directed to vehicle brake parts utilizing elastomeric polymer compounds displaying improved processability and improved cure characteristics. These elastomeric polymers are generally of the ethylene, alpha-olefin, vinyl norbornene type.

BACKGROUND

Recent general trends in motors vehicles, particularly automobiles, have been that the size of vehicles is smaller compared to the automobiles generally available during the first three quarters of the 20th century. Additionally, the vehicles are becoming more aerodynamically designed. These two factors, among others, generally make the engine compartments of today's motor vehicles smaller than engine compartments of earlier automobiles. Even with the decreasing size of engine compartments, more functions and equipment are finding their way into the engine compartment. Additionally, today's smaller engines with higher revolutions and more torque are now powering vehicles.

The combination of these factors lead to higher and higher temperatures in the engine compartment or under the hood of a motor vehicle. Such increasing temperatures put additional stresses on parts in the engine compartment. As an example, in Northern latitudes, extreme low ambient temperatures will be experienced by majority of the components in the automobile. At those low temperatures, the rubber parts must retain much of their original flexibility to insure correct function. Upon starting and after warm-up, the engine compartment temperature, will be substantially the same in most latitudes. Accordingly, the low temperature performance specification for most automobile parts is generally fixed by the most extreme ambient conditions, while the high temperature specification has increased due to the factors mentioned above, and usually is fixed by the running temperature of the engine.

The engine compartment temperature may reach 120° C. and often may reaches 140° C. or even 150° C., generally when the vehicle stops after operation and no cooling is exerted from the outside air flow as would be experienced during moving operation. Such temperature extremes (high and low), whether endured for a relatively short period of time such as in daily vehicle use, or especially, endured for long periods during the vehicle life, put additional stress or demands upon all parts in an engine compartment. Elastomeric compounds for engine compartment use must first function at these temperatures and further must retain a useful life over all or a majority part of the vehicular life which may extend to 10 years or more than 200 thousand miles.

In addition to a long life at severe temperature extremes, the underhood parts are often or always in contact with common vehicular fluids, such as brake fluid, air conditioning coolant, radiator coolants and the like. This exposure or aging at high temperature in hostile environments can be detrimental to materials such as elastomeric automobile parts, and lead part suppliers and manufacturers to search for materials which will, when fabricated into underhood parts, perform the same function or perhaps an improved function at broader temperature ranges, under more severe conditions. Brake parts are among the most important under the hood parts in a vehicle. They are put under additional stresses due not only to the high under the hood temperatures, but also due to the fluids they are exposed to and the pressure of those fluids during braking. The appearance of the anti-lock braking systems (ABS), which increases the stresses applied on elastomeric part of the brake system, for longer periods of time (longer guaranty time to 10 years and 200 thousand miles) has further increased the need for improved brake part performance.

In the past, most brake parts have been manufactured from compounds based on styrene butadiene rubber (SBR). Most SBR compounds have performed relatively well when engine compartment temperatures were in the range of about 100° C. Their physical properties, both as manufactured and after aging or use in hostile environments, either in a vehicle or in testing intended to simulate the environment of an automobile, begin to drop off generally above about 100° C. These properties include, but are not limited to, tensile strength, elongation at break, tear resistance, compression set and shrinkage (loss of weight).

In the recent past, because of its higher temperature resistance and its better chemical resistance to polar fluids and hot water, ethylene, alpha-olefin, non-conjugated diene, elastomeric polymer based compounds have replaced the majority of the SBR made parts, particularly in the critical applications such as brake parts. Most of the currently available ethylene, alpha-olefin, non-conjugated diene, elastomeric polymer compounds contain a diene monomer selected from the group consisting of 5-ethylidene-2-norbornene, 1,4-hexadiene, 1,6 octadiene, 5-methyl-1,4 hexadiene, 3,7-dimethyl-1,6-octadiene, or combinations thereof.

The processability of compounds made from such elastomers may be fair to poor, because generally no liquid plasticizer can be accepted to formulate the compound. Most types of oil or plasticizers that are generally added to rubber/elastomer compounds can be extracted by the brake fluid (DOT 3, a polyethylene glycol ether or DOT 4 a borate ester), leading to an unacceptable shrinkage of the part, which could negatively alter the function of this part. The ethylene, alpha-olefin, non-conjugated diene, elastomeric polymer compounds are generally formulated with polymer, carbon black, process aids, curatives, and other additives known to those of ordinary skill in the art so in compounds substantially without liquid plasticizers and/or oils. Therefore the polymer has the double role of being the plasticizing agent during the processing of the compound and providing the best of its elastic properties once cured.

The processability of a given polymer or polymer compound is also of importance in the manufacture of brake parts for consistency and general quality of production. A material which displays generally a lower viscosity at compounding and molding temperatures without the tendency to prematurely cure or scorch, would be desirable. A rubber compounder of fabricator for brake parts will plasticize or masticate the elastomer while adding materials such as waxes and/or reinforcing materials, antioxidants, antiozonants, curatives, accelerators, and other additives which would be well known to those of ordinary skill in the art, to produce an elastomer compound for use in brake parts. Generally, such plasticization, mastication, and/or compounding, or both, takes place in a roll mill or an internal kneader, such as a Banbury mixer or the like. After compounding, the materials are then fed to a device which can meter the compound (often an extruder) and force (piston of a press) the compounded elastomer into molding cavities for shaping and curing.

Improvements in brake part manufacturing economics can be attained in many ways. Economies of scale in such a molding operation might include larger presses, and larger molds with more cavities (more parts) and/or faster cycle times. Regardless of the methods used, the processability of an elastomer compound can have a substantial impact on these economies.

A lower compound viscosity could equate to more mold cavities filled faster. A faster part cure rate could lead to decreased molding cycle times, another process improvement that could also lead to economies. As explained above a lower compound viscosity for a given elastomeric polymer, will generally be limited by the viscosity of the elastomer base of the compound during the compounding step. Further, faster, more complete cures can be adjusted, within limits, by the type of or amount of curative, and the heat transfer in the mold. However, the compounder will often have to compromise between higher levels of curative and premature scorch. Premature scorch can lead to incomplete mold cavity filling and part defects. Additionally, attempting to increase heat transfer can lead to also premature scorch, part defects and incomplete mold cavity filling.

There is a commercial need, therefore, for an elastomer material which, when compounded, can provide brake parts which have improved resistance to high temperature aging in hostile environments, maintain low temperature flexibility, do not substantially shrink when exposed to heat and/or polar fluids, which have improved compound processability as measured by viscosity at high shear and injection temperatures, and improved cure rates as measured by time to cure after a mold is filled, and improved physical and compression set properties.

SUMMARY

We have discovered that brake parts made from a compound including an ethylene, alpha-olefin, vinyl norbornene elastomeric polymer will generally have improved resistance to deterioration in high temperature aging in air or polar fluids, will maintain even better low temperature performance, will resist shrinkage when exposed to heat and polar fluids compared to brake parts made from ethylene, alpha-olefin, non-conjugated dienes where the non-conjugated diene is selected from the group consisting of 5-ethylidene-2-norbornene, 1,4-hexadiene, 1,6 octadiene, 5-methyl-1,4 hexadiene, 3,7-dimethyl-1,6-octadiene, or combinations thereof.

Additionally the ethylene, alpha-olefin, vinyl norbornene elastomeric polymers and brake part components made compounds based on these elastomeric polymers will show lower viscosity, leading to improved compound processability, faster cure rate, and improved cure level over the ethylene, alpha-olefin, non-conjugated dienes mentioned above.

The vehicle brake part will comprise an ethylene, alpha-olefin, vinyl norbornene polymer, wherein a compound made utilizing such a polymer has: a) Mooney viscosity (ML 1+4 100° C.) up to about 80; b) maximum cure state MH–ML (as determined by a Monsanto oscillating disc rheometer (ODR) 2000@ 180° C., ±3° arc) of at least about 140 daN.m; c) a cure rate measured in the same conditions by the ODR of at least about 70 daN.m/min; d) a modulus @ 100% elongation of at least 5 MPa measured on pads cured 10 minutes @ 180° C.; and e) a compression set up to about 25% when measured on button cured 12 minutes @ 180° C. and compressed by 25% for 22 hours at 150° C.

BRIEF DESCRIPTION OF THE DRAWINGS

These and other features, aspects, and advantages of the present invention will become better understood with reference with the following description, appended claims, and accompanying drawings where:

FIG. 1 shows co-catalyst influence on polymer compositional distribution.

DESCRIPTION

Various embodiments of our invention concern certain classes of fabricated ethylene, alpha-olefin, vinyl norbornene elastomeric polymer articles and their uses. These articles have unique characteristics which make them well suited for use in certain applications. Brake parts, brake mechanisms, and the like made from these compounds, exhibit improved resistance to deterioration in hostile environments over brake parts, brake mechanisms, and the like based on molded and/or extruded parts made from previously available materials, such as ethylene, alpha-olefin, non-conjugated diene, elastomeric polymer's containing, for instance, 5-ethylidene-2-norbornene, 1,4-hexadiene, 1,6 octadiene, 5-methyl-1,4 hexadiene, 3,7-dimethyl-1,6-octadiene, and the like, as well as styrene butadiene rubbers (SBR) and compounds derived from them. A detailed description of certain preferred elastomeric polymers for use in fabricating such brake parts, that are within the scope of our invention, preferred methods of producing the elastomers, and the preferred applications of the molded or extruded parts follow.

Those skilled in the art will appreciate the numerous modifications to these preferred embodiments can be made without departing from the scope of the invention. For example, although the properties of brake parts are used to exemplify the attributes of the elastomeric polymers of the present invention, the elastomeric polymers have numerous other uses. To the extent that our description is specific, this is solely for the purpose of illustrating preferred embodiments of our invention and should not be taken as limiting our invention to these specific embodiments.

The use of subheadings in the description is intended to assist and is not intended to limit the scope of our invention in any way.

We have discovered that the inclusion of vinyl norbornene as the non-conjugated diene component of an ethylene, alpha-olefin, non-conjugated diene, elastomeric polymer portion of a brake part compound, produces brake parts having a higher cure state (at generally an equivalent weight percent diene for elastomeric polymers including dienes other than vinyl norbornene), or generally a lower curative level to attain the same cure state, having improved resistance to compression set, and competitive air and hot brake fluid aging results. Additionally, the ethylene, alpha-olefin, vinyl norbornene, elastomeric polymers of certain embodiments of the present invention on which the brake part compounds are based, will generally need lower levels of diene to achieve similar physical properties, when compared to brake parts made from previously available ethylene, alpha-olefin, non-conjugated diene, elastomeric polymer's based on non-conjugated dienes other than vinyl norbornene. The relatively low level of vinyl norbornene can lead to better heat aging, extending the temperature operating range or longer useful life of brake parts based on certain embodiments of the present invention, when compared with materials previously available. This feature permits the use of materials such as those described in the present invention in brake parts over a wide and realistic range of temperatures due to either ambient conditions (generally the low temperature requirement) or increased under the hood temperatures and for long useful part life.

The ability to combine brake part compounds which have improved processability, generally leading to more consistent and smoother batches, lower molding cycle times combined with improved physical properties, such as, for instance, wider operating temperature range and no diminution of other important characteristics such as shrinkage, has heretofore been generally difficult to attain. Brake parts manufactured based on the elastomeric polymers of various embodiments of the present invention will include ingredients that will be well known to those of ordinary skill in the art. Such ingredients include but are not limited to carbon black, process aids, waxes, antioxidants, accelerators, curatives, and the like.

Definition of Terms and Tests and other elastomeric polymer based parts or elastomeric polymers combined with other materials such as metal, plastic combination materials which will be known to those of ordinary skill in the art.

The Ethylene, Alpha-Olefin, Vinyl Norbornene, Elastomeric Polymer Component

The ethylene, alpha-olefin, vinyl norbornene, elastomeric polymer component contains ethylene in the range of from about 50 to about 90 mole percent ethylene, preferably in the range of from about 50 to about 70 mole percent, more preferably in the range of from about 50 to about 65 mole percent, based on the total moles of the polymer. The elastomeric polymer contains, in range of about 0.2 to about 5.0 mole percent of vinyl norbornene, preferably in the

| Parameter | Units | Test |
|---|---|---|
| Mooney Viscosity* | ML1 + 4, 125° C., MU | ASTM D 1646 |
| (elastomeric polymer content determination)* | % | ASTM D 3900 |
| Ethylene | | |
| Ethylidene Norbornene | % | FT. - Intra Red[1] |
| Vinyl Norbornene | % | FT - Infra Red/N.M.R |
| Mooney Viscosity (compound) | ML1 + 4, 100° C., MU | ASTM D 1646 |
| Mooney Relaxation (MLR) | MU.S | ASTM D 1646 |
| Mooney Scorch time | $T_s5$, 125° C., minutes | ASTM D 1646 |
| Oscillating Disk Rheometer (ODR) @ 180° C., ±3° arc | | ASTM D 2084 |
| ML | daN.m | |
| MH | daN.m | |
| $T_s2$ | minute | |
| $T_{90}$ | minute | |
| Cure rate | daN.m/minute | |
| Physical Properties press cured 10 min @ 180° C. | | |
| Hardness | Shore A | ASTM D 2240 |
| Modulus 100% | MPa | ASTM D 412 dieC |
| Tensile Strength | MPa | |
| Elongation at Break | % | |
| Hot Air Aging, 70 hrs. @ 150° C. | | ASTM D573 |
| Hardness Change | Shore A | |
| Tensile Change | % | |
| Elongation Change | % | |
| Weight Change | % | |
| Hot Aging in brake fluid, DOT 4, 7 days @ 150° C. | | ASTM D471 |
| Hardness Change | Shore A | |
| Tensile Change | % | |
| Elongation Change | % | |
| Weight Change | % | |
| Compression Set Press Cured 12 min @ 180° C. | % | ASTM D395 method "B" |
| 22 hrs/150° C./25% deflection | | |
| Tear Resistance | kN/m | ASTM D624 dieC |
| Ozone Resistance 100 hrs @ 25° C. @ 50 pphm 100% elong. | crack | ASTM D 1149 |
| Low Temperature flexibility 2 hours @ -51° C. | crack | ASTM D 1053 |
| Retraction at low temperature-TR test | °C. | ASTM D 1329 |
| Glass transition Temperature loss tangent peak at 1 Hz | °C. | DMTA dual cantilever mode |

*ethylene, alpha-olefin, diene monomer elastomeric polymer
[1]Fourier Transfer

Included in the brake part components contemplated by various embodiments of the present invention are cups, coupling disks, diaphragm cups, boots, tubing, sealing gaskets, parts of hydraulically or pneumatically operated apparatus, o-rings, pistons, valves, valve seats, valve guides, range of from about 0.2 to about 3.0 mole percent, more preferably in the range of from about 0.2 to about 2.0 mole most preferably 0.2 to about 0.8 percent. The balance of the elastomeric polymer will generally be made up of an alpha-olefin, selected from the group consisting of propylene, butene-1, hexene-1, 4-methyl-1 pentene, octene-1, decene-1, combinations thereof and the like. The preferred alpha-olefins are propylene, hexene-1, and octene-1. The alpha-olefin or alpha-olefins maybe present in the elastomeric polymer in the range of from about 10 to about 50 mole percent, preferable 30 to 50 mole percent, more preferably 35 to 50 mole percent.

The elastomeric polymer will have a Mooney viscosity ML 1+4, 125° C., generally in the range of from about 10 to about 80, preferably in the range of from about 15 to about 60, more preferably in the range of from about 20 to about 40. The elastomeric polymer will have a branching index (BI) (method of determination discussed below) generally in the range of from about 0.1 to about 0.7, preferably in the range of from about 0.1 to about 0.6, more preferably in the range of from about 0.1 to about 0.5. The elastomeric polymer will have a $M_{w\ GPC\text{-}LALLS}/M_{n,\ GPC\text{-}DRI}$ (hereinafter, $M_w/M_n$) above about 3, preferably above about 4, more preferably above about 5, most preferably above about 6.

Other Brake Compound Ingredients

Use of the terms parts per hundred parts rubber (phr) and the term parts per hundred elastomeric polymer (pphep), are considered equivalent for purposes of this application.

- Carbon black used in the reinforcement of rubber, generally produced from the combustion of a gas and/or a hydrocarbon feed and having a particle size from 20 nm to 100 nm for the regular furnace or channel black or from 150 to 350 nm for the thermal black. Level in the compound may range from 10 to 200 parts per 100 parts of elastomeric polymer (phr).
- Process aids as used in such compounds can be a mixture of fatty acid ester or calcium fatty acid soap bound on a mineral filler. They are used to help the mixing of the compound and the injection of the compound into a mold. Levels range from 0.5 to 5 (phr).
- Other types of process aid can be low molecular weight polyethylene (copolymer) wax or paraffin wax. Level may range from 0.5 to 5 phr.
- Antioxidants can be added to improve the long term heat aging, for instance a quinolein (TMQ: tri methyl hydroxyquinolein) and imidazole (ZMTI: Zincmercapto toluyl imidazole). Level ranges from 0.5 to 5 phr.
- Coagents are those used to improve the peroxide cross link density by acting: either through an addition mechanism like sulfur, thiuram (TMTDS or DPPT) (0.3 phr typically) or methacrylate (EDMA or TMPTM) or modified methacrylate and maleimide (HVA) (0.5 to 5 phr typically) or by transfer mechanism like the 1,2 polybutadiene or the alkyl cyanurate (TAC) (typically 0.5 to 5 phr) and combinations thereof
- Curative(s)
  To resist to high temperature, peroxides are used to cure the ethylene, alpha-olefin, vinyl norbornene, elastomeric polymer and the most commonly used are the butyl peroxy benzene, butyl peroxy-hexane, dicumyl peroxide, butyl peroxy-valerate, butyl peroxy methyl-cyclohexane or combinations thereof, and the like. Typical quantity ranges from 1 to 5 phr calculated on a 100 percent active base.

A compound formulated according to the recipe below will have a:
- a) a Mooney viscosity ML 1+4 100° C. up to about 80, preferably up to about 70 more preferably up to about 60, most preferably up to about 50;
- b) maximum cure state, MH−ML (ODR 180° C.±3° arc) of at least about 140 daN.m, preferably at least about 170 daN.m, more preferably at least about 190 daN.m, most preferably at least about 200 daN.m;
- c) a cure rate of at least about 70 daN.m/min. preferably at least about 80 daN.m/min, more preferably at least about 90 daN.m/min, most preferable at least about 100 daN.m/min;
- d) modulus at 100% of at least about 5 MPa, preferably at least about 7 MPa, more preferably at least about 9 MPa, most preferably at least 11 MPa;
- e) compression set (22 hrs @ 150° C.) up to about 25%, preferably up to about 20%, more preferably up to about 15%, most preferably up to about 10%.

Compound Characteristics

| TYPICAL FORMULA USED IN BRAKE PARTS APPLICATION | |
|---|---|
| INGREDIENTS | phr (weight) |
| Elastomeric Polymer | 100 |
| Carbon Black FEF N550[1] | 65 |
| Polyethylene wax AC 617[2] | 2 |
| Process aid Struktol WB 34[3] | 1 |
| Antioxidant TMQ Flectol H[4] | 0.6 |
| Dicumyl Peroxide Dicup 40KE[5] | 6 |

[1]Cabot corp.
[2]Allied Chemical
[3]Schill und Seilacher AG
[4]Monsanto Co.
[5]Hercules

Method of Producing Ethylene, Alpha-Olefin, Non-Conjugated Diene, Elastomeric Polymer Component The Ziegler polymerization of the pendent double bond in vinyl norbornene incorporated in the polymer backbone is believed to produce a highly branched ethylene, alpha-olefin, non-conjugated diene elastomeric polymer. This method of branching permits the production of ethylene, alpha-olefin, non-conjugated diene elastomeric polymers substantially free of gel which would normally be associated with cationically branched ethylene, alpha-olefin, non-conjugated diene, elastomeric polymer elastomers containing, for instance, ethylidene norbornene as the termonomer. The synthesis of substantially gel-free ethylene, alpha-olefin, non-conjugated diene elastomeric polymer elastomers containing vinyl norbornene is discussed in Japanese laid open patent applications JP 151758, and JP 210169.

Preferred embodiments of the aforementioned documents to synthesize polymers suitable for this invention are described below:

The catalyst used are $VOCl_3$ (vanadium oxytrichloride) and $VCl_4$ (vanadium tetrachloride) with the later as the preferred catalyst. The co-catalyst is chosen from (i) ethyl aluminum sesqui chloride (SESQUI), (ii) diethyl aluminum chloride (DEAC) and (iii) equivalent mixture of diethyl aluminum chloride and triethyl aluminum (TEAL). As shown in FIG. (1), the choice of co-catalyst influences the compositional distribution in the polymer. Other catalysts and co-catalysts contemplated are discussed in the two Japanese laid open patent application incorporated by reference above. The polymer with broader compositional distribution is expected to provide worse low temperature properties. The polymerization is carried out in a continuous stirred tank reactor at 20°–65° C. at a residence time of 6–15 minutes at a pressure of 7 kg/cm2. The concentration of vanadium to alkyl is from 1 to 4 to 1 to 10. About 0.3 to 1.5 kg of polymer is produced per gm of catalyst fed to the reactor. The polymer concentration in the hexane solvent is in the range of 3–7% by weight.

The resulting polymers had the following molecular characteristics:

The intrinsic viscosity measured in decline at 135° C. are in the range of 0.5–2.0 dl/g. The molecular weight distribution ($M_w/M_n$) is greater than or equal to 3. The branching index is in the range 0.1–0.6.

For peroxide cure applications, vinyl norbornene containing ethylene, alpha-olefin, non-conjugated diene elastomeric polymers require lower levels of peroxide to attain the same cure state compared to ethylene, alpha-olefin, non-conjugated diene elastomeric polymers with, for example, ethylidene norbornene termonomer. Typically 20 to 40% lower peroxide consumption can be realized at constant diene content using ethylene, alpha-olefin, vinyl norbornene elastomeric polymer. The efficiency of vinyl norbornene in providing high cross link density with peroxide vulcanization also permits a reduction in the overall diene level necessary to generally attain the same cure state as ethylidene norbornene polymers. This results in enhanced heat aging performance, generally owing to lower diene incorporation. This unique combinations of improved processability, lower peroxide usage and enhanced heat aging are the benefits provided by ethylene, alpha-olefin, vinyl norbornene elastomeric polymer (terpolymers or tetropolymers) over conventional non-conjugated dienes such as ethylidene norbornene or other.

The relative degree of branching in ethylene, alpha-olefin, non-conjugated diene elastomeric polymers is determined using a branching index factor. Calculating this factor requires a series of three laboratory measurements[1] of polymer properties in solutions. These are:

(i) weight average molecular weight ($M_{w,LALLS}$) measured using a low angle light scattering (LALLS) technique subsequent to a gel permeation chromatograph (GPC)

(ii) weight average molecular weight ($M_{w,DRI}$) and viscosity average molecular weight ($M_v$,DRI) using a differential refractive index detector (DRI) (with GPC) and (iii) intrinsic viscosity (IV) measured in decalin at 135° C. The first two measurements are obtained in a GPC using a filtered dilute solution of the polymer in trichloro benzene.

[1]VerStrate, Gary"Ethylene-Propylene Elastomers", *Encyclopedia of Polymer Science and Engineering;* 6 2nd edition, (1986)

An average branching index is defined as:

$$BI = \frac{M_{v,br} \times M_{w,DRI}}{M_{w,LALLS} \times M_{v\,DRI}} \quad (1)$$

where, $M_{v,br}=k(IV)^{1/a}$; $M_{v,br}$ is viscosity average molecular weight for branched polymer and 'a' is the Mark-Houwink constant (=0.759 for ethylene, alpha-olefin, diene monomer elastomeric polymers in decalin at 135° C).

From equation (1) it follows that the branching index for a linear polymer is 1.0, and for branched polymers the extent of branching is defined relative to the linear polymer. Since at a constant $M_n$, $(M_w)_{branch}>(M_w)_{linear}$, BI for branched polymers is less than 1.0, and a smaller BI value denotes a higher level of branching. It should be noted that this method indicates only the relative degree of branching and not a quantified amount of branching as would be determined using direct measurement, i.e. NMR.

Another method of measuring branching and its effect on molecular weight distribution is through the use of Mooney Relaxation area (MLR) (ASTM1646). At a constant Mooney, MLR is sensitive to branching and molecular weight distribution. More branched and/or broader molecular weight distribution polymers have a higher MLR, when compared at the same Money viscosity.

The synthesis of ethylene, alpha-olefin, vinyl norbornene elastomeric polymers are conducted a laboratory pilot unit (output about 4 Kg/day).

Metallocene catalysis of the above monomers is also contemplated including a compound capable of activating the Group 4 transition metal compound of the invention to an active catalyst state is used in the invention process to prepare the activated catalyst. Suitable activators include the ionizing noncoordinating anion precursor and alumoxane activating compounds, both well known and described in the field of metallocene catalysis.

Additionally, an active, ionic catalyst composition comprising a cation of the Group 4 transition metal compound of the invention and a noncoordinating anion result upon reaction of the Group 4 transition metal compound with the ionizing noncoordinating anion precursor. The activation reaction is suitable whether the anion precursor ionizes the metallocene, typically by abstraction of $R_1$ or $R_2$, by any methods inclusive of protonation, ammonium or carbonium salt ionization, metal cation ionization or Lewis acid ionization. The critical feature of this activation is cationization of the Group 4 transition metal compound and its ionic stabilization by a resulting compatible, noncoordinating, or weakly coordinating (included in the term noncoordinating), anion capable of displacement by the copolymerizable monomers of the invention. See, for example, EP-A-0 277,003, EP-A-0 277,004, U.S. Pat. No. 5,198,401, U.S. Pat. No. 5,241,025, U.S. Pat. No. 5,387,568, WO 91/09882, WO 92/00333, WO 93/11172 and WO 94/03506 which address the use of noncoordinating anion precursors with Group 4 transition metal catalyst compounds, their use in polymerization processes and means of supporting them to prepare heterogeneous catalysts. Activation by alumoxane compounds, typically, alkyl alumoxanes, is less well defined as to its mechanism but is none-the-less well known for use with Group 4 transition metal compound catalysts, see for example U.S. Pat. No. 5,096,867. Each of these U.S. documents are incorporated by reference for purposes of U.S. patent practice.

EXAMPLES

Example 1

Example 1 is a ethylene, propylene, and vinyl norbornene elastomeric polymer made, using $VOCl_3$ catalyst and ethylaluminum sesquichloride cocatalyst.

Ethylene is present at 51.6 weight percent. Vinyl norbornene is present at 1.7 weight percent. The remainder of the terpolymer was made up of propylene. The raw polymer has a Mooney viscosity ML 1+4, 125° C. of 21 and a Mooney relaxation MLR of 145, showing a high level of branching.

Example 2

Example 2 is polymerized in substantially the same way as Example 1, except using the $VCl_4$ as the catalyst. The ethylene content is 48.9 weight percent and vinyl norbornene content was approximately 1.9 weight percent. Again, the remainder of the elastomeric polymer is made up of propylene. In this example the elastomer has a Mooney viscosity of ML 1+4, 125° C. of 20 and a Mooney relaxation (MLR) of 206. It shows an even higher level of branching compared with Example 1, generally indicative of improved processing during the compounding operation.

Comparative Example 3

Comparative Example 3 is an ethylene/propylene/ethylidene norbornene terpolymer prepared in a conventional Ziegler polymerization reaction. The product is produced in a single reactor without ammonia to promote cationic branching.

The intention is to improve the processability by the addition of some level of branching, but not sufficient to gel the polymer. Branching in general plasticize the rubber and make easier the filler incorporation and the filler dispersion. It is particularly important in this application as there is substantially no oil or liquid plasticizer in the brake part compounds. The polymer has an ethylene content of 47.5 weight percent, ethylidene norbornene content of 5.1 weight percent, and the remainder of the elastomeric polymer is propylene. The Mooney viscosity ML 1+4, 125° C. is 17 and the MLR is 98. As can be seen from these data, at equivalent molecular weight, the branching with this technique is not as efficient as the ethylene, alpha-olefin, vinyl norbornene, elastomeric polymer, as shown by the Mooney relaxation test(MLR).

Comparative Example 4

Comparative Example 4 is polymerized to broaden the molecular weight distribution and produced a structure as described in the (Datta-Kresge) U.S. Pat. No. 4,722,971 incorporated herein by reference for purposes of U.S. Patent Practices.

In this particular example, ethylene content is 48.3 weight percent, the ethylidene norbornene content is 5.0 weight percent, and the remainder of the polymer is made up of propylene. The Mooney viscosity ML 1+4, 125° C. is 26 and the MLR is 146.

The polymer obtained has the same MLR as example 1, but at a higher Mooney viscosity, indicating lower processibility than examples 1 & 2.

Examples 5–9

Examples 5–9 utilized the elastomers of Examples 1–4 as well as a commercially available ethylene, alpha-olefin, ethylidene norbornene, elastomeric polymer (Vistalon® 2504 available from Exxon Chemical Company). Vistalon 2504 has an ethylene content of approximately 50 weight percent, an ENB content of approximately 4 to 5 weight percent, with the remainder being propylene. This product has a typical Mooney Viscosity ML 1+4, 125° C. of 26 and a typical MLR of 70 (See Table II). All the materials are compounded as shown in Table I. Physical properties are then run on the 5 samples, including Mooney viscosity, Mooney scorch time, and oscillating disk rheometer (ODR) data. The conditions of blending the compounds for Examples 5–9 are shown in Table II. As can be seen from Table II, processability during the compounding step of Examples 5, 6, and 7 are acceptable, offering a smooth handling on open mill and easy sheet off for preparing the strip shape necessary to feed the injection press. Those of Examples 8 and 9 are generally less than acceptable due to the high stiffness of the batch giving an operator a hard time to when handling the batch on the open mill, showing high bagging, difficult knife cutting and uneasy sheet off. As can be seen from the Mooney viscosity of the compounds in Table I, two compounds (Example 5 and Example 6) based on ethylene, alpha-olefin, vinyl norbornene, elastomeric polymer have substantially lower Mooney viscosities measured a 100° C., generally translating into improved ease of process ability both in the compounding step and the step of injecting the materials into a mold. The commercially available elastomer, shown as Example 9, has nearly an order of magnitude higher Mooney viscosity indicating a much stiffer compound difficult to move or inject.

The cure characteristics measured by the oscillating disk rheometer (Monsanto ODR 2000E at 180° C., ±3° arc) show the higher cure state of the ethylene, alpha-olefin, vinyl norbornene elastomeric polymer based compound as measured by the difference MH–ML. As the cross link density is more effective with these types of polymers (Table I). The cure rate measured with the same apparatus describes the speed of formation of carbon to carbon cross link through radical species and shows the advantage of the ethylene, alpha-olefin, vinyl norbornene, elastomeric polymer vs. the ethylene, alpha-olefin, ethylidene norbornene, elastomeric polymer (Table I). It is an advantage for the rubber compounder to have high cure rate to increase productivity.

Turning to Table III where the physical properties of the elastomeric compounds measured on pads defined by the ASTM D 412 which were cured in a laboratory electrical press for 10 minutes at 180° C.

Table III demonstrates that at an equivalent hardness, the modulus of the vinyl norbornene polymers is generally higher than the modulii of the ethylidene norbornene containing polymers. It is a characteristic typical of a higher cure state, which is beneficial in this type of application where for example a brake cup has to hold very high pressure during the braking process. The tensile strength of Examples 5 and 6 are generally in the range of those examples made with ethylidene norbornene, since the average molecular weight among those polymers is very much the same. The elongation at break values reflect also the higher degree of cross linking for the ethylene, alpha-olefin, vinyl norbornene, elastomeric polymer. The air aging data show among other things that the two vinyl norbornene containing elastomeric polymers, Examples 5 and 6, generally do not loose weight after air aging. This is an important factor when considering that the brake parts often are required not to shrink during their service life, because such shrinkage could be a point of failure for a brake system. Also noted is the compression set of the materials which indicates good resistance to compression set and well meeting the specification. At that low level of compression set, we cannot expect a larger improvement since there is a physical limitation with the polymer composition (ethylene content and molecular weight).

The low temperature properties have been determined through the measure of the glass transition temperature of the compound by a method using the Dynamic Mechanical Thermal Analyzer (DMTA). It has measured the dynamic loss tangent of the cured rubber in a dual cantilever bending mode with a shear oscillation of 1 Hz at an amplitude of 0.62 mm over a range of temperature from −70° C. and +150° C., ramping at 2° C./minute. The result shows that at equal ethylene content, the best of the ethylene, alpha-olefin, non-conjugated diene, elastomeric polymer containing ethylidene norbornene still has a tanδ peak at a higher temperature (−41.9° C.) than the elastomeric polymer containing vinyl norbornene (−44.1° C.). This demonstrates elastomeric polymer containing vinyl norbornene offers a lower temperature flexibility to the brake part, demanded to day by the producers of those components.

Conclusion

The present invention has been described in considerable detail with reference to certain preferred versions thereof, other versions are possible. For example, while brake parts have been exemplified, other uses are also contemplated. Therefore, the spirit and scope of the appended claims should not be limited to the description of the preferred versions contained herein.

TABLE I

| Compound batch | Example 5 | Example 6 | Example 7 | Example 8 | Example 9 |
|---|---|---|---|---|---|
| EPDM | 100 | 100 | 100 | 100 | 100 |
| FEF N-550 | 65 | 65 | 65 | 65 | 65 |
| PE Wax AC 617 | 2 | 2 | 2 | 2 | 2 |
| Struktol WB 34 | 1 | 1 | 1 | 1 | 1 |
| Flectol H | 0.5 | 0.5 | 0.5 | 0.5 | 0.5 |
| Dicup 40KE | 6 | 6 | 6 | 6 | 6 |
| Total PHR | 174.5 | 174.5 | 174.5 | 174.5 | 174.5 |
| Mooney Viscosity ML(1 + 4), 100° C. | 52 | 54 | 67 | 83 | 101 |
| Scorch Ms 125° C. | | | | | |
| Viscosity, MU | 12 | 24 | 28 | 34 | 37 |
| Ts5, Minute | >30 | 24 | 36 | 25 | 13 |
| ODR ± 3° arc, 180° C. | | | | | |
| ML daN.m | 11.5 | 8 | 8 | 12.5 | 15 |
| MH daN.m | 210 | 182 | 132 | 147 | 106 |
| MH − ML daN.m | 198.5 | 174 | 124 | 134.5 | 91 |
| Ts2, min | 0.65 | 0.75 | 0.8 | 0.8 | 0.8 |
| T90, min | 3.8 | 4.0 | 2.4 | 4.3 | 4.2 |
| Cure rate daN.m/min | 108 | 89 | 47 | 53 | 35 |

TABLE II

| No. | Example 5 | Example 6 | Example 7 | Example 8 | Example 9 |
|---|---|---|---|---|---|
| ML 1 + 4, 125° C. | 21 | 20 | 17 | 26 | 26 |
| Ethylene, weight % | 51.6 | 48.9 | 47.5 | 48.3 | 50 |
| ENB, weight % | / | / | 5.1 | 5.0 | 5 |
| VNB, weight % | 1.7 | 1.9 | / | / | / |
| MLR, 125° C. | 145 | 206 | 98 | 146 | 70 |
| Mixing | | | | | |
| B.I.* Time, sec. | 100 | / | 100 | 100 | / |
| Dump Time, sec. | 300 | 300 | 225 | 275 | 200 |
| Dump Temp, °F. | 300 | 270 | 300 | 300 | 320 |
| Processing | + | ++ | + | − | − |
| Comments | OK | easy/ smooth | OK | dry/stiff | dry/stiff |

*Carbon Black incorporation

TABLE III

| No. | Example 5 | Example 6 | Example 7 | Example 8 | Example 9 |
|---|---|---|---|---|---|
| Physical Properties, press cured 5 min @ 180° C. | | | | | |
| Hardness, shore A | 73 | 75 | 73 | 71 | 76 |
| 100% Modulus, MPa | 9.3 | 10.7 | 6 | 3.2 | 4.1 |
| Tensile Strength, MPa | 12.3 | 13.5 | 16.4 | 11.5 | 16.4 |
| Elongation, % | 125 | 115 | 200 | 240 | 250 |
| Air Aging, 70 hrs @ 150° C. | | | | | |
| Hardness, change | 2 | 4 | 5 | 7 | 4 |
| Tensile Change, % | 8 | 10 | −25 | 4 | 10 |
| Elongation Change, % | 23 | 19 | 2 | 11 | 20 |
| Weight Change, % | 1.2 | 2.5 | 1.2 | 1.2 | 0 |
| Brake Fluid Aging DOT 4, 7 days, 150° C. | | | | | |
| Hardness Change | 1 | 0 | 1 | — | −3 |
| Tensile Change, % | −20 | −20 | 6 | — | 6 |
| Elongation Change, % | −18 | −1.7 | 3 | — | 7 |
| Volume Change, % | 5.8 | 6 | 2.7 | 2.8 | 2 |
| Compression Set | | | | | |
| 22 hrs/150° C./25% def | 19 | 22 | 28 | 25 | 20 |

TABLE III-continued

| No. | Example 5 | Example 6 | Example 7 | Example 8 | Example 9 |
|---|---|---|---|---|---|
| Tear Resistance | | | | | |
| Die C, kN/m | 3.7 | 4.2 | 5.0 | — | 5.3 |

We claim:

1. A vehicle part comprising an ethylene, α-olefin, vinyl norbornene elastomeric polymer; wherein a compound including said elastomeric polymer has:
   a) a ML 1+4 100° C. up to about 80;
   b) a MH–ML (as determined by ODR @ 180° C., ±3° arc) of at least about 140 daN.m
   c) a cure rate at least about 70 daN.m/min.
   d) a 100% modulus at least about 5 MPa; and
   e) a compression set (22 hrs @ 150° C.) up to about 25%;
   wherein said elastomeric polymer has a $M_w/M_n$ greater than 6.

2. The vehicle part of claim 1 wherein said elastomeric polymer includes said ethylene in the range of from about 50 to about 90 mole percent, said vinyl norbornene being present in the range of from about 0.2 to about 5 mole percent, said alpha-olefin being present in the range of from about 10 to about 50 mole percent, said mole percents based on the total moles of said elastomeric polymer; and said elastomeric polymer has a Mooney viscosity, ML (1+4), 125° C. in the range of from about 10 to about 80.

3. The vehicle part of claim 1 wherein said elastomeric polymer includes said ethylene in the range of from about 50 to about 70 mole percent, and said vinyl norbornene in the range from about 0.2 to about 3 mole percent, said alpha-olefin being present in the range of from about 30 to about 50 mole percent, based on the total moles of the polymer; and an elastomeric polymer Mooney viscosity ML (1+4) 125° C. in the range of from about 15 to about 60.

4. The vehicle part of claim 1 wherein said elastomeric polymer includes said ethylene in the range of from about 50 to about 65 mole percent, and said vinyl norbornene in the range from about 0.2 to about 2.0 mole percent, said alpha-olefin being present in the range of from about 35 to about 50 mole percent, based on the total moles of the polymer; and an elastomeric polymer Mooney viscosity ML (1+4) 125° C. in the range of from about 20 to about 40.

5. The vehicle part of claim 1 wherein said alpha-olefin is selected from the group consisting of propylene, butene-1, and octene-1.

6. The vehicle part of claim 4 wherein said compound has:
   a) a Mooney viscosity ML 1+4 100° C. up to about 70;
   b) a cure state MH–ML (as determined by ODR @ 180° C., ±3° arc) of at least about 190 daN.m/min;
   c) a cure rate at least about 80 daN.m/min. determined by ODR;
   d) a 100% modulus at least about 7 MPa; and
   e) a compression set (22 hrs @ 150° C.), up to about 15%.

7. The vehicle part of claim 1 wherein said elastomeric polymer includes said ethylene in the range of from about 50 to about 65 mole percent, and said vinyl norbornene in the range from about 0.2 to about 0.8 mole percent, said alpha-olefin being present in the range of from about 35 to about 50 mole percent, based on the total moles of the elastomeric polymer, wherein said alpha-olefin is propylene wherein said elastomeric polymer has a branching index in the range of from about 0.1 to about 0.6;
   wherein said compound including said polymer has;
   a) a ML 1+4 100° C. up to about 50;
   b) a MH–ML at least about 200 daN.m;
   c) a cure rate at least about 100 daN.m/min;
   d) a 100% modulus of at least about 9 MPa; and
   e) a compression set (22 hrs @ 150° C.) up to about 10%.

8. The vehicle part of claim 7, wherein said part is a brake part.

9. The vehicle part of claim 8, wherein said brake part is selected from the group consisting of cups, coupling disks, diaphram cups, boots, tubing, sealing gaskets, o-rings, pistons, valves, valve seats, valve guides, and combinations thereof.

10. A vehicle brake part comprising an ethylene, propylene, vinyl norbornene elastomeric polymer wherein;
    a) said ethylene is present in the said elastomeric polymer in the range from about 50 to about 65 mole percent, and vinyl norbornene is present in said polymer in the range from about 0.2 to about 0.8 mole percent, said propylene is present in the range of from about 35 to about 50 mole percent, said mole percents based on the total moles of said elastomeric polymer;
    wherein said elastomeric polymer has a Mw/Mn greater than 6; and
    wherein a compound made from said elastomeric polymer
    b) has:
        i) a ML 1+4 100° C. up to about 50;
        ii) a MH–ML of at least about 200 daN.m;
        iii) a cure rate of at least about 100 daN.m/min;
        iv) a 100% modulus at least about 9 MPa; and
        v) a compression set (22 hrs @ 150° C.) up to about 10%.

11. A vehicle comprising a vehicle body and a brake part wherein;
    a) said brake part includes an ethylene, alpha-olefin, vinyl norbornene elastomeric polymer, wherein;
        i) said ethylene is present in said elastomeric polymer in the range of from about 50 to about 65 mole percent;
        ii) said alpha-olefin is present in said elastomeric polymer in the range of from about 35 to about 50 mole percent;
        iii) said vinyl norbornene is present in said elastomeric polymer in the range of from about 0.2 to about 0.8 mole percent; said mole percent based on the total moles of said elastomeric polymer; wherein said elastomeric polymer has a branching index in the range of from about 0.1 to about 0.6, and a $M_w/M_n$ above about 6.

* * * * *